United States Patent
Bahlmann et al.

(10) Patent No.: US 10,443,158 B2
(45) Date of Patent: Oct. 15, 2019

(54) METHOD FOR THE SAFE STARTING AND/OR STOPPING OF A ROTOR OF A ROTOR SPINNING MACHINE AND THE ROTOR SPINNING MACHINE

(71) Applicant: Rieter CZ s.r.o., Usti nad Orlici (CZ)

(72) Inventors: Bernd Bahlmann, Schrobenhausen (DE); Mario Maleck, Walting (DE); Miroslav Stusák, Chocen (CZ); Milan Moravec, Usti nad Orlici (CZ); Jiri Sloupensky, Usti nad Orlici (CZ); Peter Dirnberger, St. Florian (AT)

(73) Assignee: Rieter CZ s.r.o., Usti nad Orlici (CZ)

( * ) Notice: Subject to any disclaimer, the term of this patent is extended or adjusted under 35 U.S.C. 154(b) by 449 days.

(21) Appl. No.: 15/211,626

(22) Filed: Jul. 15, 2016

(65) Prior Publication Data

US 2017/0016150 A1    Jan. 19, 2017

(30) Foreign Application Priority Data

Jul. 17, 2015    (DE) .......................... 10 2015 111 673

(51) Int. Cl.
*D01H 4/44*    (2006.01)
(52) U.S. Cl.
CPC ..................... *D01H 4/44* (2013.01)
(58) Field of Classification Search
CPC ....................................................... D01H 4/44
See application file for complete search history.

(56) References Cited

U.S. PATENT DOCUMENTS

| | | | |
|---|---|---|---|
| 4,158,284 A | 6/1979 | Wehde | |
| 4,777,790 A * | 10/1988 | Raasch | D01H 4/44 57/261 |
| 5,509,261 A * | 4/1996 | Wassenhoven | D01H 4/32 57/100 |
| 5,799,476 A * | 9/1998 | Bahlmann | B65H 63/00 57/263 |
| 6,937,918 B2 * | 8/2005 | Bahlmann | D01H 4/42 700/130 |
| 7,111,446 B2 | 9/2006 | Wassenhoven et al. | |
| 7,752,831 B2 * | 7/2010 | Balboul | D01H 4/44 57/264 |
| 7,919,947 B2 | 4/2011 | Balboul | |
| 2003/0070414 A1 | 4/2003 | Pohn et al. | |
| 2005/0279076 A1 | 12/2005 | Wassenhoven et al. | |
| 2009/0230897 A1 | 9/2009 | Coenen | |

FOREIGN PATENT DOCUMENTS

| | | |
|---|---|---|
| CN | 204 174 353 U | 2/2015 |
| DE | 26 58 477 | 6/1978 |
| DE | 44 04 243 A1 | 8/1995 |
| DE | 101 17 095 A1 | 10/2002 |
| DE | 10 2004 029 020 A1 | 12/2005 |
| DE | 10 2005 035 055 A1 | 2/2007 |
| DE | 10 2007 000 851 A1 | 6/2008 |
| DE | 10 2007 028 935 A1 | 12/2008 |
| DE | 10 2009 032 716 A1 | 1/2011 |
| EP | 1 612 308 A2 | 1/2006 |
| EP | 2 110 470 A2 | 10/2009 |
| WO | WO 2007/012358 A1 | 2/2007 |
| WO | WO 2009/059704 A1 | 5/2009 |

OTHER PUBLICATIONS

German Search Report, dated Jun. 17, 2016.
EP Search Report, dated Nov. 22, 2016.

* cited by examiner

*Primary Examiner* — Shaun R Hurley
(74) *Attorney, Agent, or Firm* — Dority & Manning, P.A.

(57) ABSTRACT

A method is provide for the safe starting and/or stopping of a rotor of a rotor spinning machine for the production of yarn, the spinning machine having a multiple number of rotors that rotate in a respective rotor housing covered by a lid. Each rotor is driven by its own motor and is held in at least one radially and/or axially active magnetic bearing by means of a position controller. Each motor is in communication with a control unit through a data connection to control the rotor in various operating states. One or more of the following conditions is checked against predetermined target values or states: (1) control for the drive of the rotor; (2) position control for the active magnetic bearings; (3) data connection for controlling the motor. In the event that the predetermined target values or states are not met, start of the rotor is blocked or the motor that is already running is selectively stopped.

12 Claims, 4 Drawing Sheets

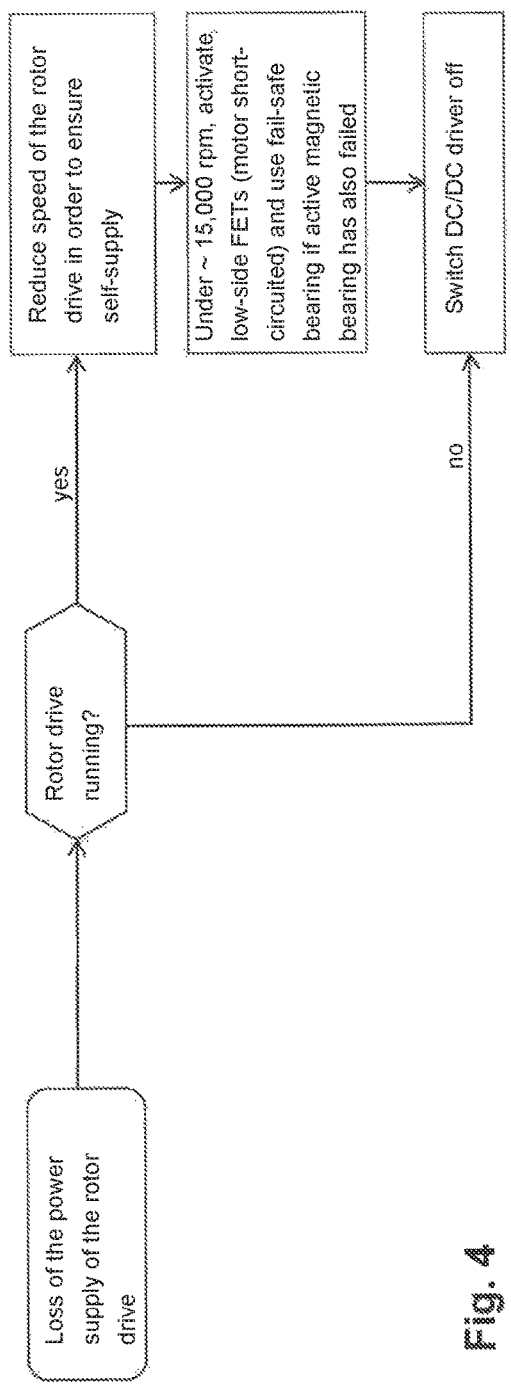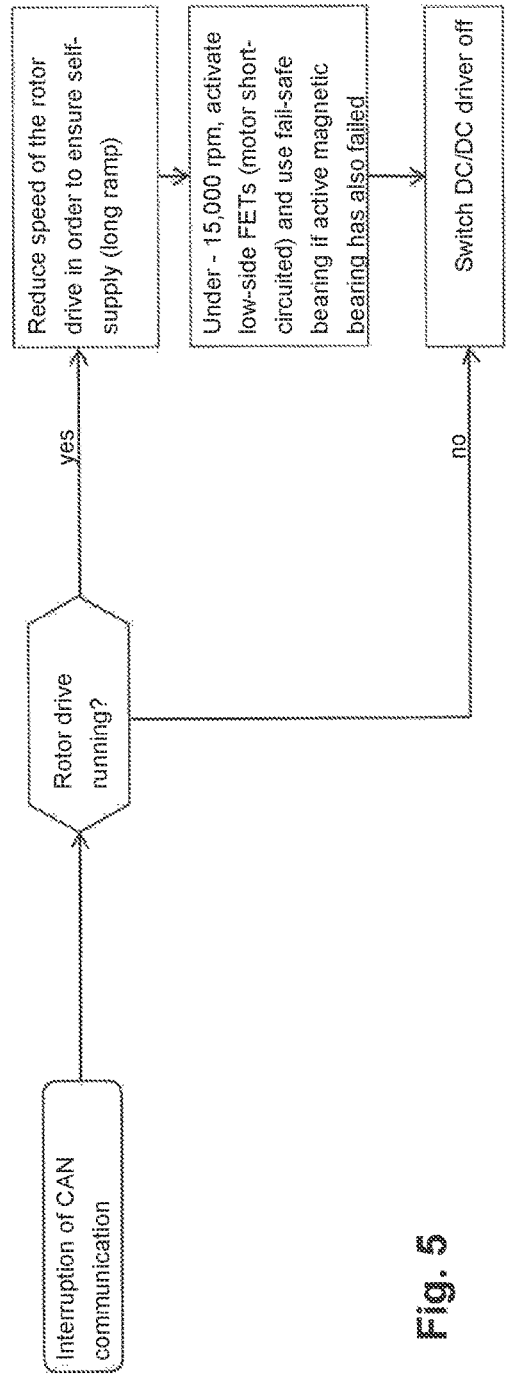
Fig. 4
Fig. 5

METHOD FOR THE SAFE STARTING AND/OR STOPPING OF A ROTOR OF A ROTOR SPINNING MACHINE AND THE ROTOR SPINNING MACHINE

FIELD OF THE INVENTION

The present invention relates to a method for the safe starting and/or stopping of a rotor of a rotor spinning machine for the production of yarns, with a multiple number of motors, each of which rotates in a rotor housing covered by a lid. Each rotor is driven by its own motor and is held in at least one radially and/or axially active magnetic bearing by means of a position controller. A data connection of the motor with a control unit is provided, in order to control the rotor in various operating states.

BACKGROUND

DE 10 2007 000 851 A1 discloses an open-end spinning device with a spinning rotor. The spinning rotor is driven around its shaft by means of a belt. The spinning rotor is located in a rotor housing, which is covered by a lid element. The opening of the rotor housing (that is, the removing the lid element from the rotor housing) can only take place by means of raising a handle piece. By lifting the handle piece, the rotor is braked, such that a rotation of the rotor when the rotor housing is opened is prevented. This avoids the risk of injury to an operator caused by a rotor that is still rotating.

A single drive of a rotor of an open-end spinning machine is known from DE 26 58 477 A1. Each rotor has its own drive and is thereby connected to a control unit. The control unit brings about the fact that, for example, upon a defectively spun yarn, a change to the current absorbed by the spinning rotor is registered and, if necessary, a shutdown of the motor is effected.

Even if, in the state of the art, approaches are described with which a rotor is to be stopped with an open-end spinning device, nevertheless, a detailed safety concept cannot be recognized from this.

SUMMARY OF THE INVENTION

As such, a task of this invention is a method for the safe starting and/or stopping of a rotor of a rotor spinning machine, and creating a corresponding rotor spinning machine with which a safety concept for responding to various errors is obtained. Additional objects and advantages of the invention will be set forth in part in the following description, or may be obvious from the description, or may be learned through practice of the invention.

The tasks are solved with a method and a rotor spinning machine according to the characteristics as described herein.

The method in accordance with the invention for the safe starting and/or stopping of a rotor of a rotor spinning machine for the production of yarns features a multiple number of motors, each of which rotates in a rotor housing covered by a lid, whereas each rotor is driven by its own motor and is held in at least one radially and/or axially active magnetic bearing by means of a position controller. A data connection of the motor with a control unit is provided in order to control various operating states. In accordance with the invention, there is a check of the control for the drive of the rotor and/or the position control for the one or more active magnetic bearings, the data connection for controlling the motor, and, in an advantageous version of the invention, the properly closed lid, and, in the event that predetermined target values and/or states are not met, the start of the rotor is blocked or the motor that is already running is selectively stopped.

If the control for the drive of the rotor is checked, upon a defective control of the drive, on one hand, it is ensured that defective yarn is not produced. On the other hand, it is also ensured that the rotor, which may, in the present case, reach rotational speeds in the range of 200,000 revolutions/min, is not destroyed by the defective operation, which could lead to hazards to personnel and the destruction of the rotor spinning machine.

Through monitoring the position control for the one or more active magnetic bearings, it is achieved that the rotor always remains in its position. If the rotor leaves its intended position, there is a risk that defective yarn will be produced or the destruction of the spinning device will take place.

Upon a defective data connection between the motor and the control unit of the motor, the reliable operation of the spinning device can no longer be ensured. Moreover, this must lead to the fact that the rotor cannot be started or, if this state is detected while the rotor is already running, there must be an attempt to stop the rotor without causing damage as much as possible.

Finally, it is also important that the lid properly seals the rotor housing. If this is not the case, on the one hand, no yarn is spun and, on the other hand, there is once again a risk to the operator who could reach into a rotating rotor and injure himself.

In all of such cases described above, there is a check of whether a correspondingly required target value or state is reached or maintained. If this is not the case, the start of the rotor is blocked or the motor that is already running is selectively stopped. In this manner, damage to the machine and the risk of injury to the operator are avoided.

In a particularly advantageous version of the invention, the speed of the rotor in the event of a loss of a power supply of the motor in coordination with additional drives, which are necessary for yarn production, is slowly reduced, in order to maintain yarn production. Such other drives may be, for example, a feed drive, an opening roller drive, a draw-off roller drive or a winding drum drive. If shutting down these drives in proportion to each other is successful, essentially the same yarn is spun, but with reduced speed. Through selectively reducing the speeds of the individual drives in the same ratio to each other, in this phase, yarn that must be later wound by the coil and disposed of is not produced. Since, with modern rotor spinning machines with speeds of approximately 300 m/min, a large amount of yarn is produced in a very short time, in the most unfavorable case, this would lead to the disposal of many meters of yarn.

If, upon a loss of power supply and falling below a minimum speed of the rotor, in particular approximately 15,000 revolutions/min, the motor is short-circuited, only a run-down of the motor takes place, and targeted yarn production is no longer possible. However, the advantage here is that, at such point in time at which a controlled spinning of yarns is no longer possible for lack of sufficient rotor speed, the yarn tears and an additional yarn is no longer spun. Upon a short-circuited motor, the rotor runs down without any control.

Upon a loss of the position control and/or data connection to the control unit and/or to the power supply, the rotor preferably runs down slowly, and serves as a generator for the magnetic bearing. This ensures that the magnetic bearing, which is responsible and is particularly important, among other things, for the trouble-free running of the rotor, is held in operation in this manner for a correspondingly long period of time. Only if there is a falling short of a certain non-critical rotational speed is it possible to support the rotor even when the magnetic bearing is no longer active until it is at a standstill, without damaging it.

It is particularly advantageous if, upon a loss of position control, the rotor is pushed in the direction of an axial fail-safe bearing. This ensures that the rotor does not come to lie in an uncontrolled manner and moves out from the magnetic bearings. The axial fail-safe bearing intercepts the rotor in a corresponding safe manner.

Preferably, the lid is locked as long as the rotor runs above a predetermined minimum speed. Such predetermined minimum speed may be, for example, 15,000 revolutions/min. At this rotational speed, the rotor of the machine and the operator are less at risk, and the rotor comes to a standstill in a relatively short period of time by itself.

The lid is preferably locked magnetically, mechanically and/or electrically. Thereby, the locking of the lid may take place very easily with the control unit.

In a particularly advantageous version of the invention, the check of whether the lid may be opened takes place redundantly. If, particularly through the checking of the rotational speed and the current operating state of the rotor, it is ensured that the lid may in fact only be opened if the rotor is at a safe range of rotational speeds or at a standstill, damage or injury may be safely prevented. Through the redundant checking, defective measuring devices are detected, and thus do not lead to a defective assessment of the rotor state.

If, upon opening the lid at an excessively high rotational speed, in particular more than 15,000 revolutions/min, an emergency stop of the rotor is initiated, it is ensured that the rotor comes to a standstill in the shortest possible period of time. The emergency stop may take place, for example, through a corresponding power supply, with which the rotor drive is electrically braked. This measure is particularly advantageous, since a rotor at a very high rotational speed has an extremely high potential for injury. Thus, it is possible that the rotor is moved out from its bearing or even bursts. Thereby, an injury to the operator and damage to the rotor spinning machine are highly probable. As such, there are attempts to bring the rotor to a standstill in the shortest period of time.

If, during the emergency stop for a defined time or up to a defined speed, the drive control remains activated, it is ensured that the rotor is brought into its safe range of rotational speeds or to a standstill, without damages and very rapidly where possible. In addition, this measure contributes to still being able to spin a yarn.

If the emergency stop of the rotor takes place electrically, mechanically and/or magnetically, the rotor can be stopped with a suitable measure as rapidly as possible.

A rotor spinning machine in accordance with the invention features a safety concept that is operated with the steps of the method as previously described. Such a rotor spinning machine is able to, upon the occurrence of a defective state, react as rapidly as possible and either not at all be started or be selectively stopped. Thereby, such stopping can be carried out either so that yarn production is maintained as long as possible, or that the rotor is stopped as soon as possible, or is at least shut down in a non-critical range of rotational speeds.

Thereby, an injury to the operator or damage to the rotor spinning machine may be reliably avoided.

BRIEF DESCRIPTION OF THE DRAWINGS

Further advantages of the invention are described in the following embodiments. Herein, different safety concepts are presented in the figures. The following is shown:

FIG. 4 is the "Loss of the power supply of the rotor drive" concept;
FIG. 5 is the "Interruption of CAN communication" concept.

DETAILED DESCRIPTION

Figure 1:
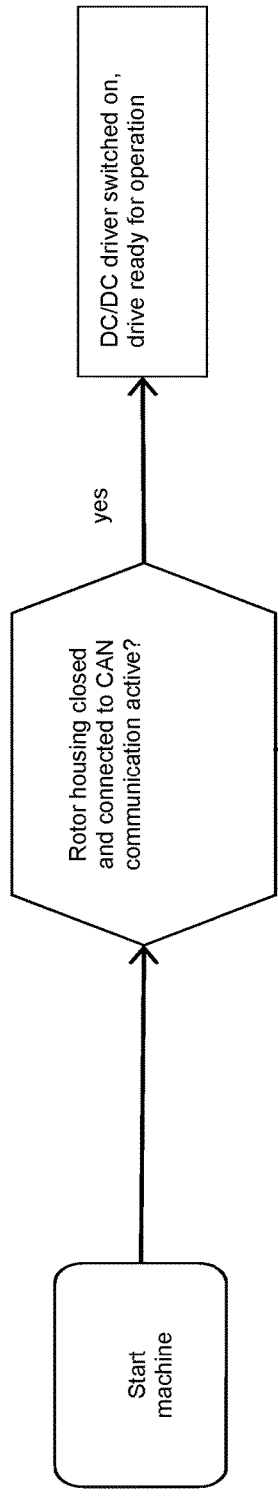
FIG. 1 is the "Start machine" concept.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

Safety requirements that should be adhered to when operating the machine include, for example, that the rotor housing must remain closed while the rotor is above a certain speed value. In addition, the machine may start only if the box is closed and locked. The unlocking of the lid of the rotor housing may not be bridged by the control unit, just as safety measures and control states may not be used for unlocking.

In order to enable the opening of the rotor housing, while the rotor is still moving and the energy of the rotor that is still rotating is below a defined value, a measured value redundant for the speed of the rotor must be determined. Such a redundant and discrete measured value may tap, for example, the voltage of the motor, which is essentially proportional to the speed of the rotor. From this, a logic signal may be generated, which means, for example, that the rotor speed is low.

If the rotor housing is opened while the rotor is rotating at a high speed (for example, because the shutter mechanism has failed), the motor is actively shut down. This may take place, for example, by the fact that the highest possible current acts on the motor during the first four seconds, in order to brake it electrically. In this manner, the rotor is stopped as soon as possible. Without such a measure, stopping the rotor would require approximately 60 seconds.

Preferably, all used sensor technologies, for example the generation of a signal that indicates that the rotor housing is closed, just as the closing and emergency stop mechanisms should be used in a redundant and fail-safe manner as far as possible. This ensures that, even with a failure of a first measure, a second measure and/or a second sensor means is provided in order to detect a state and/or a target value.

The following figures represent safety concepts that are used upon specific events.

The "Start machine" safety concept shown in FIG. 1 checks whether the rotor housing is closed, and whether a connection to the CAN communication between the rotor drive and the control unit is present and active. In addition, there may also be a check of whether the position control of the active magnetic bearing is operable. If all such tests are successfully completed, a DC/DC driver is switched on, and the drive is made ready for operation. If it is determined that one of the checks cannot be satisfactorily completed, this initiates the DC/DC driver being switched off and the low-side FETs being activated. The motor is thereby short-circuited and can no longer be operated. Thus, hazards caused by the accidental starting of the motor is ruled out.

Figure 2:
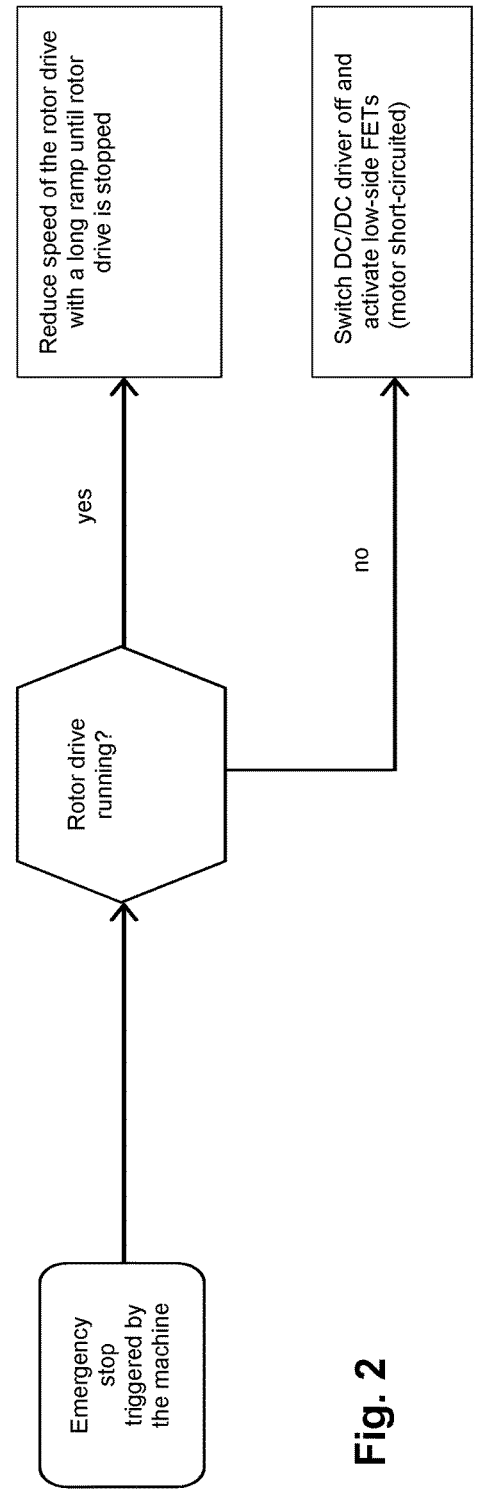
FIG. 2 is the "Emergency stop triggered by the machine" concept.

According to FIG. 2, with the "Emergency stop triggered by the machine" safety concept, there is an initial check of whether the rotor drive is running. If this is affirmed, the speed of the rotor drive is lowered, at least to a minimum speed. That is, the speed of the motor for the spinning rotor is reduced. Thereby, with a preferred version of the invention, it is possible that the speed is reduced with a long ramp. This means that the speed is taken back very slowly. In particular, if the other drives of the spinning unit are synchronously slowly driven back, it is possible that further yarn, in the ideal case even yarn that corresponds to the yarn produced in normal operation, can be spun. From a certain speed (for example, 15,000 rev/min), the rotor will no longer be able to produce a corresponding yarn. From this point in time, it is possible to stop the rotor rapidly, thus with a steep ramp. If it is determined that the rotor is no longer in rotational movement, or has only a very low rotational speed, such as less than 15,000 revolutions/min, the DC/DC driver is switched off and the low-side FETs are activated. Thus, the motor is short-circuited and runs down or is stopped by other means.

Figure 3:
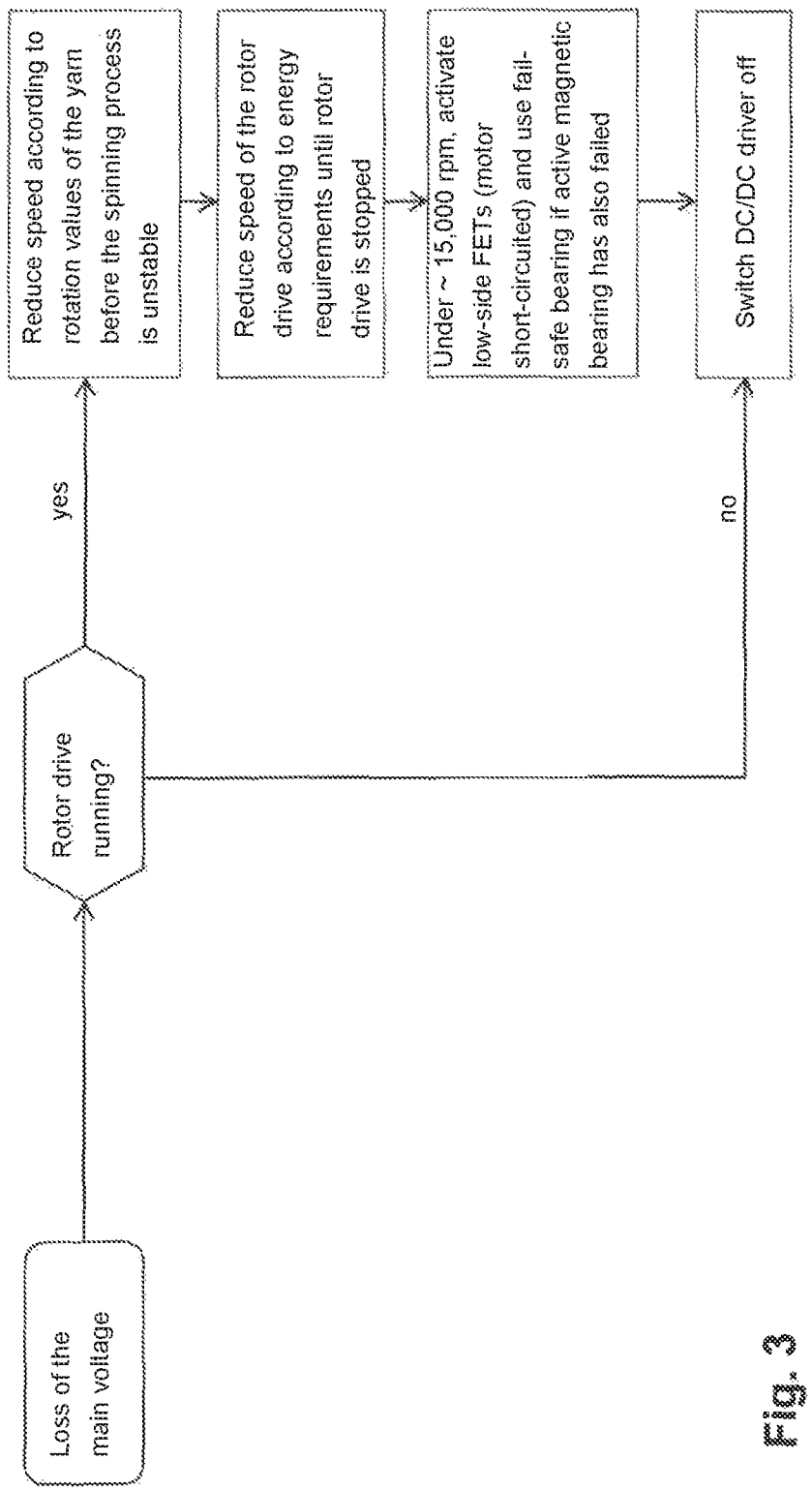
FIG. 3 is the "Loss of the main voltage" concept.

FIG. 3 describes the safety concept of "Loss of the main voltage." Once again, there is an initial check of whether the rotor is running. If this is the case, the speed is reduced in a manner corresponding to the rotation values of the yarn before the spinning process is unstable. Thus, there is an attempt to carry out the stopping operation such that yarn can still be spun. Ideally, the yarn essentially corresponds to the yarn of the normal state of the spinning unit. If the spinning process is unstable (for example, if the rotational speed of the rotor is too low for spinning), measures are taken to reduce the speed of the rotor drive in a manner corresponding to the energy requirements of the machine. This means that the rotor is further reduced in its speed and, as a generator, supplies the magnetic bearing (for example) with power, so that the bearing of the rotor is further operable. If the rotational speed of the rotor is lowered further (for example, under 15,000 revolutions/min), low-side FETs are activated and the motor is thereby short-circuited. Thus, the motor no longer produces power as a generator, and the magnetic bearings may no longer be supplied with a corresponding voltage. In this case, it is advantageous if fail-safe bearings are provided, which, upon a failure of the active magnetic bearings to be expected, intercept the rotor. The fail-safe bearings also bring about the fact that, upon the switching off or loss of the power supply, the bearing elements are not destroyed by the rotor. For example, it may be provided that, upon a failure of the active magnetic bearings, the rotor runs down to a stop and is braked there mechanically. It is in this case advantageous if the rotor is pushed in an axial direction, in which it can be intercepted in a stable manner. Finally, the DC/DC driver is switched off and the rotor housing can be opened.

FIG. 4 shows the safety concept of "Loss of the power supply of the rotor drive." Here as well, there is an initial check of whether the rotor drive is running. If the rotor is not running, the DC/DC driver is switched off. However, if the rotor is still in motion, the speed of the rotor drive is reduced so that the self-supply through the operation of the generator is still ensured. From a certain speed (for example, 15,000 revolutions/min), low-side FETs are activated and the motor is short-circuited. If the active magnetic bearings likewise fail, the fail-safe bearings are used for the rotor. As soon as the rotor drive is no longer running, the DC/DC drivers are switched off. The rotor housing may be opened from such point in time by removing the lid.

FIG. 5 shows the safety concept of "Interruption of CAN communication." The procedure is similar to the concept of "Loss of the power supply of the rotor drive" in accordance with FIG. 4. The speed of the rotor drive is reduced in order to ensure the self-supply. Preferably, the rotor drive is shut down over a long ramp, so that the spinning operation may still be maintained. Upon reaching a low speed (for example, 15,000 revolutions/min), low-side FETs are activated and, if necessary, the fail-safe bearings are used if the active magnetic bearings have failed. If the rotor is at a standstill, the DC/DC drivers are switched off. Thereafter, the safety concept for the event of "Interruption of CAN communication" is ended.

Figures 6, 7:
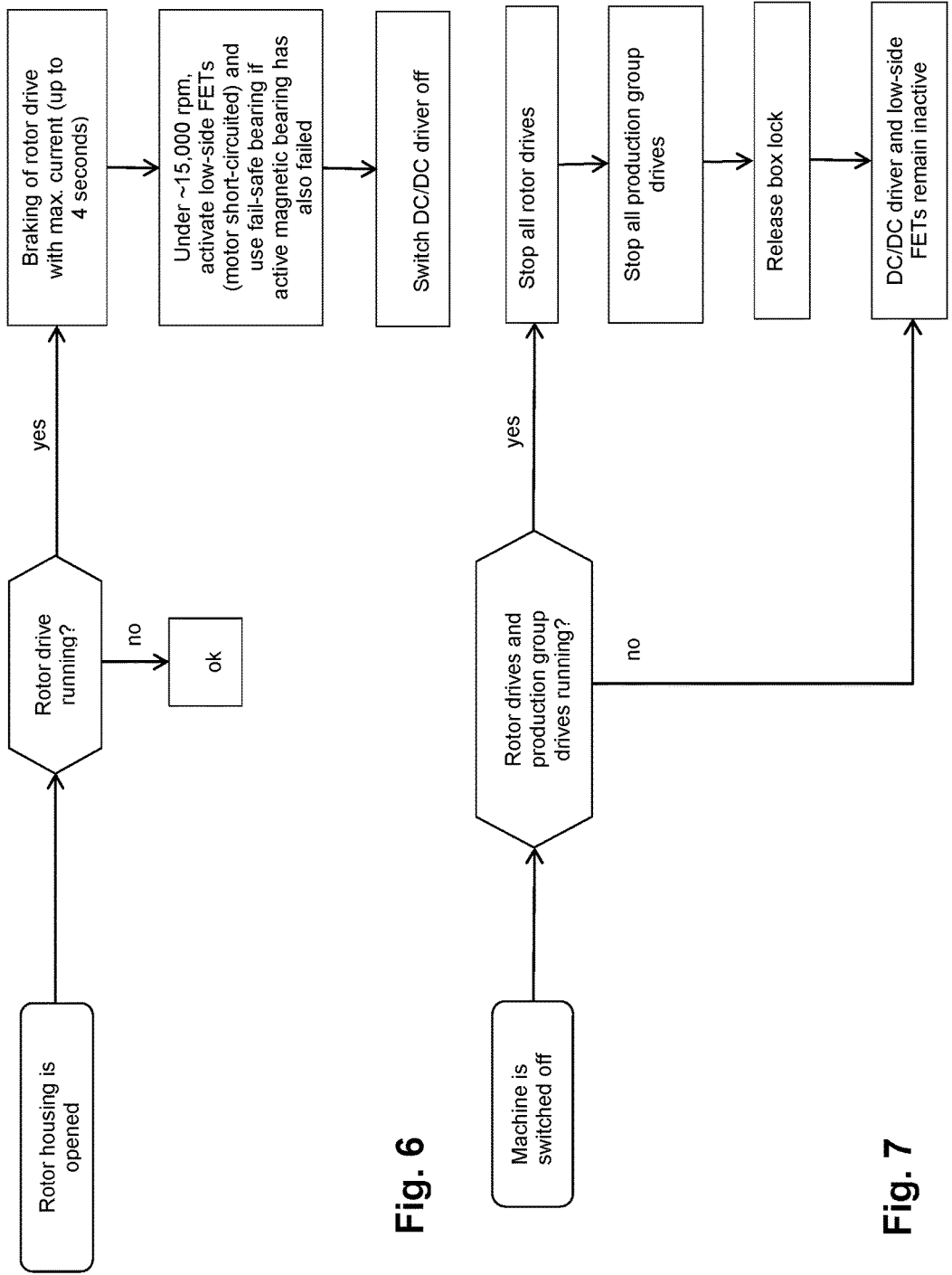
FIG. 6 is the "Rotor housing is opened" concept.
FIG. 7 is the "Machine is switched off" concept.

FIG. 6 describes the method of "Opening of the rotor housing." If the rotor drive is still running, the rotor is applied with maximum current for up to 4 seconds. Very rapidly, the drive device is thereby braked electrically to a low speed. Under approximately 15,000 revolutions/min, the measures described above are then taken. Thus, the low-side FETs are activated and the motor is short-circuited. Where necessary, the fail-safe bearings are used if the active magnetic bearings have also failed, to prevent damages. Finally, the DC/DC drivers are switched off, in order to have the spinning device in a safe condition.

According to FIG. 7, the DC/DC driver and low-side FETs remain inactive if, upon the "Switching off of the motor," rotor drives and production group drives are no longer running. However, if it is determined that the rotor drives and production group drives are still running, all rotor drives are initially stopped. Then, all production group drives are stopped. Only if all the drives are switched off can the rotor housing locks of the spinning positions be released. Finally, it is ensured that the DC/DC driver and low-side FETs remain inactive, in order to keep the machine in a safe condition. This is also the case if, upon the first check, it is determined that the rotor drives and production group drives are no longer running. At that point, there is once again a check of whether the DC/DC driver and low-side FETs are inactive, in order to secure the machine.

With the described method for the safe starting and/or stopping of a rotor, it is highly important that the rotor is started only if all safety measures have been fulfilled, or if predetermined target values and/or states are reached. If this is not the case, the start of the rotor is blocked or the rotor that is already running is selectively stopped. By selectively stopping, damages to the machine and injuries to the operator are avoided, and, in the ideal case, during the stopping, yarn that is similar to the yarn produced in the normal spinning process is also generated. In addition to the safety aspects, the presented concept thus ensures a production increase, since, despite defective conduct of individual components being attempted, usable yarn can be produced.

In summary, some or all of the following states may be essential, in order 1. to be able to start the rotor:
    the rotor housing must be closed in order to obtain AC power transmission
    all cables from the control unit to the spinning unit must be in order
    the control unit must function correctly in order to generate signals
2. to have to stop the rotor:
    spin box opened
    damage to the spinning unit transformers broken or short-circuited cable from the control unit to the spinning unit malfunction of the sensors the control unit does not generate a safety signal This invention is not limited to the illustrated and described embodiments. Variations within the scope of the claims, just as the combination of characteristics, are possible, even if they are illustrated and described in different embodiments.

The invention claimed is:

1. A method for the safe starting and/or stopping of a rotor of a rotor spinning machine for the production of yarn, the spinning machine having a multiple number of rotors that each rotates in a rotor housing covered by a lid, whereas each rotor is driven by its own motor and is held in at least one radially and/or axially active magnetic bearing by means of a position controller, each of the motors in communication with a control unit through a data connection to control the rotor in various operating states, the method comprising:
checking one or more of the following conditions against predetermined target values or states: (1) control for the drive of the rotor; (2) position control for the active magnetic bearings; (3) data connection for controlling the motor;
in the event that the predetermined target values or states are not met, start of the rotor is blocked or the motor that is already running is selectively stopped; and
wherein in the event of a loss of a power supply to the motor, the speed of the rotor is slowly reduced in coordination with additional drives that are necessary for yarn production in order to maintain yarn production as the rotor speed is reduced.

2. The method according to claim 1, wherein upon rotor speed falling below a minimum speed, the motor is short-circuited.

3. The method according to claim 2, wherein upon the motor being short-circuited, the rotor speed runs down without control.

4. A method for the safe starting and/or stopping of a rotor of a rotor spinning machine for the production of yarn, the spinning machine having a multiple number of rotors that each rotates in a rotor housing covered by a lid, whereas each rotor is driven by its own motor and is held in at least one radially and/or axially active magnetic bearing by means of a position controller, each of the motors in communication with a control unit through a data connection to control the rotor in various operating states, the method comprising:
checking one or more of the following conditions against predetermined target values or states: (1) control for the drive of the rotor; (2) position control for the active magnetic bearings; (3) data connection for controlling the motor;
in the event that the predetermined target values or states are not met, start of the rotor is blocked or the motor that is already running is selectively stopped; and
wherein upon the predetermined target value or state not being met for conditions (2) and (3), or in the event of a loss of a power supply to the motor, the speed of the rotor is slowly reduced and the motor serves as a generator for the magnetic bearing.

5. A method for the safe starting and/or stopping of a rotor of a rotor spinning machine for the production of yarn, the spinning machine having a multiple number of rotors that each rotates in a rotor housing covered by a lid, whereas each rotor is driven by its own motor and is held in at least one radially and/or axially active magnetic bearing by means of a position controller, each of the motors in communication with a control unit through a data connection to control the rotor in various operating states, the method comprising:
checking one or more of the following conditions against predetermined target values or states: (1) control for the drive of the rotor; (2) position control for the active magnetic bearings; (3) data connection for controlling the motor;
in the event that the predetermined target values or states are not met, start of the rotor is blocked or the motor that is already running is selectively stopped; and
wherein upon the predetermined target value or state not being met for condition (2), the rotor is pushed in the direction of an axial fail-safe bearing.

6. A method for the safe starting and/or stopping of a rotor of a rotor spinning machine for the production of yarn, the spinning machine having a multiple number of rotors that each rotates in a rotor housing covered by a lid, whereas each rotor is driven by its own motor and is held in at least one radially and/or axially active magnetic bearing by means of a position controller, each of the motors in communication with a control unit through a data connection to control the rotor in various operating states, the method comprising:
checking one or more of the following conditions against predetermined target values or states: (1) control for the drive of the rotor; (2) position control for the active magnetic bearings; (3) data connection for controlling the motor;
in the event that the predetermined target values or states are not met, start of the rotor is blocked by the controller or the motor that is already running is selectively stopped by the controller; and
in addition to the one or more conditions (1)-(3), further comprising checking for (4) the properly closed lid, and, in the event that a predetermined target value or state is not met for condition (4), the start of the rotor is blocked or the motor that is already running is selectively stopped.

7. The method according to claim 6, wherein lid is locked as long as the rotor runs above a predetermined minimum speed.

8. The method according to claim 7, wherein the lid is locked magnetically, mechanically, or electrically.

9. The method according to claim 6, wherein the checking for the properly closed lid is done redundantly.

10. The method according to claim 7, wherein upon opening the lid at above the predetermined minimum speed of the rotor, an emergency stop of the rotor is initiated.

11. The method according to claim 10, wherein during the emergency stop for a defined time or up to a defined speed of the rotor, the drive control for the rotor remains activated.

12. The method according to claim 10, the emergency stop of the rotor takes place electrically, mechanically, or magnetically.

* * * * *